United States Patent Office 3,705,201
Patented Dec. 5, 1972

3,705,201
ALKYLATION OF AROMATICS WITH ALKYL HALIDES
Stephen N. Massie, Palatine, Ill., assignor to Universal Oil Products Company, Des Plaines, Ill.
No Drawing. Filed June 14, 1971, Ser. No. 153,111
Int. Cl. C07c 3/52
U.S. Cl. 260—671 C    9 Claims

ABSTRACT OF THE DISCLOSURE

An alkylatable aromatic hydrocarbon is alkylated with an alkyl halide at a temperature in the range from about 45° F. to about 600° F. in the presence of a catalyst comprising a molybdenum-carbon monoxide compound in which the molybdenum is present in a zero valence state.

BACKGROUND OF THE INVENTION

This invention relates to a process for alkylating an alkylatable aromatic hydrocarbon with an alkyl halide. More specifically, this invention relates to a process for producing an alkylaromatic hydrocarbon from an alkylatable aromatic hydrocarbon and an alkyl halide in the presence of a catalyst comprising a molybdenum-carbon monoxide compound in which the molybdenum is present in a zero valence state.

Alkylaromatic compounds are useful as raw material in the production of polymers and resins. For example, ethylbenzene may be dehydrogenated to form styrene, which can be polymerized to form a commonly used plastic. Similarly, cumene may be oxidized to form phenol, which is used to provide phenolic resins. In another aspect, alkylaromatics having $C_9$–$C_{20}$ alkyl side chains are useful in the preparation of detergents. Thus, a process for producing alkylaromatics provides a method for obtaining useful and economically desirable products.

BRIEF DESCRIPTION OF THE INVENTION

Therefore, it is an object of this invention to provide a process for producing an alkylaromatic hydrocarbon from an alkyl halide and an aromatic hydrocarbon.

Another object of this invention is to provide a process for alkylating an alkylatable aromatic hydrocarbon with an alkyl halide utilizing a catalyst comprising a compound of molybdenum and carbon monoxide.

In an embodiment, this invention relates to a process for alkylating an alkylatable aromatic hydrocarbon with an alkyl halide to produce an alkylation reaction product, which process comprises contacting said aromatic hydrocarbon with said alkyl halide and with a catalyst comprising a molybdenum-carbon monoxide compound, in which the molybdenum is present in a zero valence state, in an alkylation zone at alkylation conditions, and recovering said alkylation reaction product in the effluent from said alkylation zone.

In one limited embodiment, this invention relates to a process for producing cumene and polyisopropylbenzenes which comprises contacting benzene with 2-chloropropane and with a catalyst comprising molybdenum hexacarbonyl in an alkylation zone at a temperature between about 45° F. and about 600° F. and a pressure between about one atmosphere and about 200 atmospheres and recovering said cumene and said polyisopropylbenzenes in the effluent from said alkylation zone.

Various other aspects, objects and embodiments of the present invention will become apparent from the following detailed description.

DETAILED DESCRIPTION OF THE INVENTION

The alkylation conditions appropriate to the process of the present invention include a temperature in the range from about 45° F. to about 600° F. and a pressure in the range from about 1 atmosphere to about 200 atmospheres or more. Preferably, the pressure in an alkylation zone in an embodiment of the present invention will be held at a level sufficient to maintain the major portion of the reactants in the liquid phase. Pressures greater than atmospheric may be obtained by employing a gas inert in the reaction such as nitrogen, argon or methane. Carbon monoxide may also be employed to produce superatmospheric pressure in the alkylation zone, although an inert gas may be preferred. Partial pressures of any or all of the above-noted, or other suitable gases may be utilized in combination to provide a suitable pressure in the alkylation zone in the present process. Alkylation conditions also preferably include the absence in the alkylation zone of certain compounds, comprising ligands, for example, triphenylphosphine, which inhibit the desired reaction by forming strong complexes with molybdenum-carbon monoxide compounds. In embodiments of the present invention in which an aromatic hydrocarbon and $C_2$–$C_{20}$ alkyl halides are utilized as reactants, it is preferred that a temperature between about 70° F. and about 400° F. be maintained at alkylation conditions in an alkylation zone. The process of this invention may be carried out in the presence of paraffins and/or naphthenes, which are substantially inert in the reaction.

Alkylatable aromatic hydrocarbons which may suitably be utilized in the process of this invention include benzene and alkylaromatics such as toluene, cumene, mesitylene, etc. Aromatic compounds having only one alkyl group attached to the aromatic ring are preferred over aromatics having a larger number of side chains. Particularly preferred are benzene, toluene and cumene. Alkyl halides which may suitably be employed in the process of this invention include those wherein the carbon atom which is bonded to the halogen atom is also bonded to at least two alkyl groups of at least one carbon atom each. Examples of suitable alkyl halides of this type include 2-chloropropane, 2-bromopropane, 2-iodopropane, 2-chlorobutane, 2-chlorodecane, etc., including alkyl halides having carbon chains of twenty or more, and 2-chloro-2-methylpropane, 2-chloro-3-methylbutane, etc. Other alkyl halides which may suitably be employed in the process of this invention include those wherein the carbon atom which is bonded to the halogen atom is also bonded to a phenyl group. Examples of alkyl halides of this type include benzyl chloride, benzyl bromide, benzyl iodide, 1-chloro-1-phenylethane, 1-chloro-1-phenyl-pentane, etc. The phenyl group may be mono- or poly-substituted with alkyl groups, halogen atoms, etc., for example, methylbenzyl chlorides, chlorophenyl-1-chloroethanes, etc. Primary chlorides such as 1-chlorobutane, 1-chlorodecane, etc., except as hereinbefore set forth, are not suitable for use as an alkyl halide in the process of the present invention.

The process of this invention may be embodied in a batch reaction scheme or a continuous reaction scheme. The molar ratio of alkylatable aromatic reactant to olefinic reactant present in the reaction in any specific embodiment will depend on the alkylation reaction product desired from the process in the particular embodiment. For example, when benzene and 2-chloropropane are utilized in an embodiment of this invention, a molar excess of benzene over 2-chloropropane in the alkylation zone will result in the creation of an alkylation reaction product comprising primarily cumene; an excess of 2-chloropropane over benzene will result in a reaction product comprising primarily polyisopropylbenzenes. An example of an alkylation zone suitable for an embodiment of the process of this invention, utilizing a batch reaction scheme, is a rotating autoclave which will contain the reactants and catalyst at alkylation conditions. The alkylation reaction product produced in the process of this invention can be separated from the effluent of an alkylation zone by any of various means known to the hydrocarbon processing art. For example, the effluent from an autoclave as described above may be fractionated, solvent extracted, crystallized, etc., to recover the desired alkylaromatic products. Specific examples of the alkylation reaction products which can be produced in the process of the present invention are, for example, ethylbenzene, the diethylbenzene isomers, cumene, the diisopropylbenzene isomers, butylbenzenes, pentylbenzenes, hexylbenzenes, etc., cymene, diisopropyltoluene, etc., diphenylalkanes, phenyl-alkylnaphthanes, etc.

The molybdenum-carbon monoxide compound to be utilized in the present process may comprise molybdenum hexacarbonyl or a complex of molybdenum, carbon monoxide and an aromatic hydrocarbon. It is thought that the mechanism of the alkylation reaction in the present process involves the formation of an intermediate complex comprising molybdenum, carbon monoxide and the aromatic and subsequent reaction of this complex in the alkylation. For example, in an embodiment wherein benzene is to be alkylated with chloroethane, benzene, chloroethane and molybdenum hexacarbonyl are contacted at alkylation conditions. The benzene and molybdenum-carbon monoxide compound interact to form benzene tricarbonyl, which further interacts with chloroethane, leading to the alkylation reaction product, ethylbenzene. Thus, it is contemplated that not only molybdenum hexacarbonyl but also, for example, benzene molybdenum tricarbonyl, toluene molybdenum tricarbonyl, o-xylene molybdenum tricarbonyl, m-xylene molybdenum tricarbonyl, p-xylene molybdenum tricarbonyl, cumene molybdenum tricarbonyl, mesitylene molybdenum tricarbonyl, etc., are suitable for use as the catalyst in particular embodiments of the process of this invention. The aromatic compound with which molybdenum and carbon monoxide are complexed need not be the aromatic compound which is to be alkylated in the process of the invention. For example, a catalyst comprising pentamethylbenzene molybdenum tricarbonyl may be utilized in an embodiment wherein benzene and propylene are to be alkylated. Preferred compounds include molybdenum hexacarbonyl and complexes comprising molybdenum, carbon monoxide and an aromatic hydrocarbon to be alkylated in the same reaction. For example, benzene molybdenum tricarbonyl is preferred in an embodiment wherein benzene and propylene are to be reacted.

The examples hereinafter described are intended to illustrate particular specific embodiments of the process of this invention. These examples are not intended to limit the process of this invention to the embodiments described, nor to limit the scope of this invention to that of the examples. From the description hereinbefore provided, the broad scope of this invention and modifications and variations thereunder will be made apparent to one skilled in the art.

EXAMPLE I 76 grams (1 mole) of benzene and 1.0 gram (0.0038 mole) of molybdenum hexacarbonyl were placed in the glass liner of an 850 ml. rotating autoclave. The autoclave was sealed, and 78.5 grams (1 mole) of isopropyl chloride were introduced. The pressure in the autoclave was increased to 35 atmospheres by charging nitrogen. The contents of the autoclave were heated to 285° F., held at that temperature for 16 hours and then cooled to room temperature. The autoclave was depressurized and the liquid contents were withdrawn and analyzed. It was found that 85% by weight, of the isopropyl chloride charged to the autoclave had been converted to alkylaromatics. The alkylaromatic products were found to constitute, by weight, 60% cumene, 20% p-diisopropylbenzene, 13% m-diisopropylbenzene, 4% 1,2,4-triisopropylbenzene and 3% 1,3,5-triisopropylbenzene.

EXAMPLE II 78 grams of benzene, 31.6 grams (0.25 mole) of benzyl chloride and 1.0 gram of molybdenum hexacarbonyl were placed in the glass liner of the autoclave described in Example I. The autoclave was sealed and the pressure therein increased to 35 atmospheres by the addition of nitrogen. The contents of the autoclave were heated to 285° F., held at that temperature for 16 hours, and then cooled to room temperature. The autoclave was depressurized and the liquid contents were withdrawn and analyzed. It was found that 100% of the benzyl chloride charged to the autoclave had been converted to diphenylmethane.

EXAMPLE III 60.1 grams (0.5 mole) of mesitylene, 9.8 grams (0.125 mole) of isopropyl chloride and 1.0 gram of molybdenum hexacarbonyl were placed in the glass liner of the autoclave described in Example I. The autoclave was sealed and the pressure therein increased to 36 atmospheres by the addition of nitrogen. The contents of the autoclave were heated to 285° F., maintained at that temperature for 16 hours, and then cooled to room temperature. The autoclave was depressurized and the liquid contents were withdrawn and analyzed. It was found that 62% by weight, of the isopropyl chloride charged to the autoclave had been converted to 2,4,6-trimethylcumene.

I claim as my invention:

1. A process for producing an alkylation reaction product from an alkylatable aromatic hydrocarbon and an alkyl halide which comprises contacting said alkylatable aromatic hydrocarbon with said alkyl halide at alkylation conditions, in the presence of a catalyst comprising a molybdenum-carbon monoxide compound, in which compound molybdenum is present in a zero valence state.

2. The process of claim 1 further characterized in that said alkylation conditions include a temperature of from about 45° F. to about 600° F. and a pressure of from about 1 atmosphere to about 200 atmospheres.

3. The process of claim 1 further characterized in that said catalyst is molybdenum hexacarbonyl.

4. The process of claim 1 further characterized in that said alkyl halide contains a carbon atom bonded to a halogen atom and bonded to at least two carbon atoms.

5. The process of claim 1 further characterized in that said alkyl halide contains a carbon atom bonded to a halogen atom and bonded to a phenyl group.

6. The process of claim 1 characterized in that said alkylatable aromatic hydrocarbon is an aromatic hydrocarbon selected from the group consisting of benzene, toluene, o-xylene, m-xylene, p-xylene, ethylbenzene, o-diethylbenzene, m-diethylbenzene, p-diethylbenzene and mesitylene.

7. The process of claim 1 further characterized in that said alkyl halide is 2-chloropropane.

8. The process of claim 1 further characterized in that said alkyl halide is benzyl chloride.

9. The process of claim 1 further characterized in that said catalyst is an aromatic hydrocarbon-molybdenum-carbon monoxide compound selected from the group consisting of benzene molybdenum tricarbonyl, toluene molybdenum tricarbonyl, o-xylene molybdenum tricarbonyl, m-xylene molybdenum tricarbonyl, p-xylene molybdenum tricarbonyl, cumene molybdenum tricarbonyl, and mesitylene molybdenum tricarbonyl.

References Cited

UNITED STATES PATENTS

| | | | |
|---|---|---|---|
| 3,033,778 | 5/1962 | Frilette | 260—671 C |
| 3,254,023 | 5/1966 | Miale et al. | 260—671 R |
| 3,594,430 | 7/1971 | Hervert | 260—671 C |

CURTIS R. DAVIS, Primary Examiner

U.S. Cl. C.R.

260—671 R